(12) United States Patent
Peters et al.

(10) Patent No.: US 10,046,410 B2
(45) Date of Patent: Aug. 14, 2018

(54) APPARATUS AND METHOD FOR MODULATING HEAT INPUT DURING WELDING

(75) Inventors: Steven R Peters, Huntsbury, OH (US); Brian Simons, Willoughby, OH (US); Geoff Lipnevicius, Sagamore Hills, OH (US)

(73) Assignee: LINCOLN GLOBAL INC., City of Industry, CA (US)

( * ) Notice: Subject to any disclaimer, the term of this patent is extended or adjusted under 35 U.S.C. 154(b) by 1579 days.

(21) Appl. No.: 13/552,681

(22) Filed: Jul. 19, 2012

(65) Prior Publication Data

US 2014/0021182 A1 Jan. 23, 2014

(51) Int. Cl.
| | |
|---|---|
| *B23K 9/10* | (2006.01) |
| *B23K 9/02* | (2006.01) |
| *B23K 9/025* | (2006.01) |
| *B23K 9/09* | (2006.01) |
| *B23K 9/095* | (2006.01) |
| *B23K 9/12* | (2006.01) |

(52) U.S. Cl.
CPC ............ *B23K 9/0216* (2013.01); *B23K 9/025* (2013.01); *B23K 9/092* (2013.01); *B23K 9/093* (2013.01); *B23K 9/0956* (2013.01); *B23K 9/125* (2013.01)

(58) Field of Classification Search
CPC ...... B23K 9/0216; B23K 9/125; B23K 9/025; B23K 9/093; B23K 9/092; B23K 9/0956
USPC ................. 219/130.21, 130.5, 130.51, 130.4
See application file for complete search history.

(56) References Cited

U.S. PATENT DOCUMENTS

| | | | |
|---|---|---|---|
| 1,956,406 A | | 4/1934 | Vars |
| 4,270,037 A | | 5/1981 | Grinin et al. |
| 4,532,404 A | * | 7/1985 | Boillot et al. ............ 219/124.34 |
| 4,816,640 A | * | 3/1989 | Sugitani et al. ........ 219/137 PS |
| 4,972,064 A | | 11/1990 | Stava |
| 5,278,390 A | | 1/1994 | Blankenship |
| 6,023,044 A | * | 2/2000 | Kosaka et al. ........... 219/124.34 |
| 6,051,810 A | * | 4/2000 | Stava ...................... 219/137 PS |
| 6,215,100 B1 | | 4/2001 | Stava |
| 6,274,845 B1 | | 8/2001 | Stava et al. |

(Continued)

FOREIGN PATENT DOCUMENTS

| | | | |
|---|---|---|---|
| EP | 1681123 A2 * | 7/2006 | ............... B23K 9/10 |
| EP | 2455177 A1 | 5/2012 | |

(Continued)

OTHER PUBLICATIONS

International Search Report, International Appl. No. PCT/US07/64183.

(Continued)

*Primary Examiner* — Tu B Hoang
*Assistant Examiner* — Alba Rosario-Aponte
(74) *Attorney, Agent, or Firm* — Perkins Coie LLP

(57) ABSTRACT

A system and method is provided in which a welding system modulates the heat input into a weld joint during welding by changing between a high heat input welding waveform and a low heat input welding waveform. The system can utilize detected weld joint geometry and thickness to vary the utilization of the high heat and low heat waveform portions to change the weld bead profile during welding. Additionally, the wire feed speed is changed with the changes between the high heat input and low heat input portions of the welding waveform.

17 Claims, 4 Drawing Sheets

(56) References Cited

U.S. PATENT DOCUMENTS

| | | |
|---|---|---|
| 6,498,321 B1 | 12/2002 | Fulmer et al. |
| 6,501,049 B2 | 12/2002 | Stava |
| 6,717,107 B1 | 4/2004 | Hsu |
| 6,717,108 B2 | 4/2004 | Hsu |
| 6,734,394 B2 | 5/2004 | Hsu |
| 6,847,008 B2 | 1/2005 | Myers et al. |
| 7,067,767 B2 | 6/2006 | Hsu |
| 2005/0242207 A1 | 11/2005 | Kuiper et al. |
| 2006/0070983 A1* | 4/2006 | Narayanan et al. ..... 219/130.51 |
| 2008/0053978 A1* | 3/2008 | Peters et al. ............... 219/130.5 |
| 2012/0074115 A1* | 3/2012 | Kazmaier ................ B23K 9/09 |
| | | 219/130.51 |
| 2012/0097656 A1* | 4/2012 | Peters ...................... 219/130.51 |
| 2013/0112675 A1* | 5/2013 | Peters ...................... 219/130.51 |

FOREIGN PATENT DOCUMENTS

| | | | |
|---|---|---|---|
| JP | 59-141377 A | 8/1984 | |
| WO | WO 2010144931 A1 * | 12/2010 | ............... B23K 9/09 |

OTHER PUBLICATIONS

International Application No. PCT/IB2013/001569, International Search Report, 3 pages, dated Feb. 4, 2014.

\* cited by examiner

APPARATUS AND METHOD FOR MODULATING HEAT INPUT DURING WELDING

BACKGROUND OF THE INVENTION

Field of the Invention

Devices, systems, and methods consistent with the invention relate to welding, and more specifically to devices, systems and methods for modulating heat input into a weld while welding.

Incorporation by Reference

The present invention generally relates to improvement in the control and modulation of heat input during welding. U.S. Pat. Nos. 4,972,064 and 6,215,100, the entire disclosures of which are incorporated herein by reference in their entirety.

Description of the Related Art

It is generally known that heat input into a weld is an important consideration. Often a maximum heat input level is determined and then the appropriate welding waveform and parameters are selected for the weld. However, it is difficult to change these parameters or the heat input during welding. Additionally, it is difficult to adapt a welding process to different gap widths during welding. Accordingly, an improved welding methodology addressing these concerns is needed.

BRIEF SUMMARY OF THE INVENTION

An exemplary embodiment of the present invention is a system and method of welding where a welding power supply provides a current welding waveform to a welding electrode, and a wire feeder provides the welding electrode to at least one workpiece to be welded by said power supply. The current welding waveform has a first waveform portion with a first current profile and a second waveform portion with a second current profile, such that the first current profile is different from the second current profile. Further, the first waveform portion provides a higher heat input during welding than the second waveform portion, and the wire feeder provides the welding electrode at a first wire feed speed during the first waveform portion and at a second wire feed speed during the second waveform portion. The first wire feed speed is different than the second wire feed speed.

BRIEF DESCRIPTION OF THE DRAWINGS

The above and/or other aspects of the invention will be more apparent by describing in detail exemplary embodiments of the invention with reference to the accompanying drawings, in which:

FIG. 4A is a representative cross-section of an exemplary weld joint.

DETAILED DESCRIPTION OF EXEMPLARY EMBODIMENTS

Figure 1:
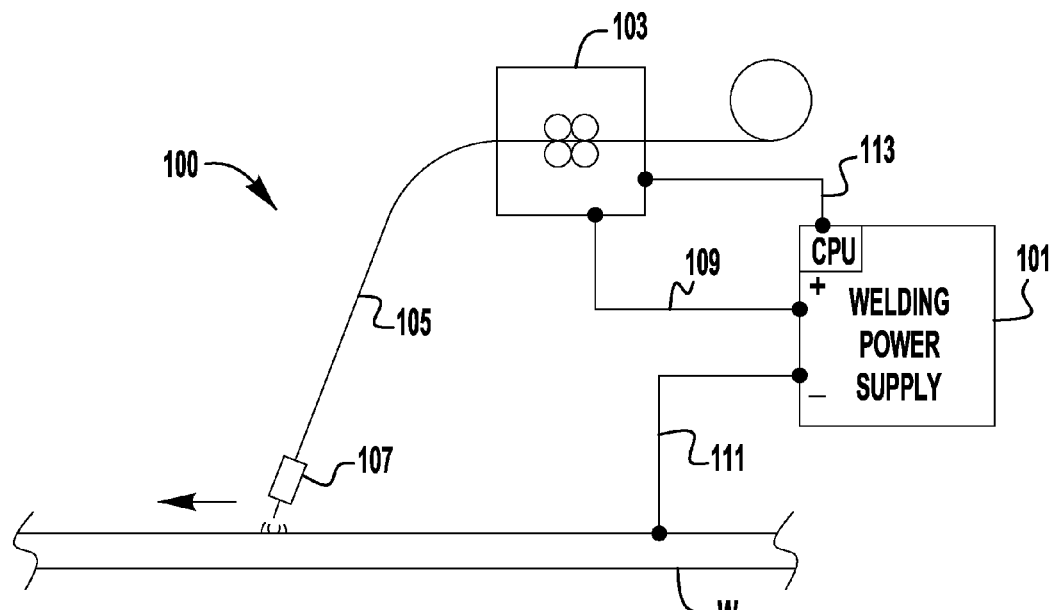
FIG. 1 illustrates a diagrammatical representation of a basic weld system according to an exemplary embodiment of the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

Referring now to the drawings wherein the showings are for the purpose of illustrating exemplary embodiments of the invention only and not for the purpose of limiting same. FIG. 1 illustrates a welding system 100 having a welding power supply 101 which provides a welding current to be used to weld the workpiece W. The welding power supply 101 can be of any known type which is capable of generating different welding waveform profiles and is capable of welding in both a DC+ and a DC− state. Further, exemplary embodiments of the welding power supply are types of power supplies that are capable of generated pulse-type welding, short arc, and/or surface tension transfer type welding waveforms. An example of such a welding power supply is the Power Wave®, manufactured by The Lincoln Electric Company of Cleveland, Ohio. Of course, embodiments of the present invention are not limited to this example. As shown in the exemplary embodiment, a first terminal of the power supply 101 is coupled to the workpiece W via a lead 111 and a second terminal is coupled to a wire feeder 103 which provides the welding waveform and a welding electrode 105 to a contact tip 107 for welding. Such a configuration is generally known and need not be described in detail. Further, the power supply 101 is coupled to the wire feeder 103 via a data communication link 113 (which can be wired or wireless) so that the power supply 101 can control the wire feeder 103 during welding. As such, in exemplary embodiments of the invention, the power supply 101 contains a computer like device so that the power supply 101 not only controls its own operation, but also that of the wire feeder. Again, such type of control is generally known.

In exemplary embodiments of the present invention, the wire feeder 103 is of a type that can quickly change the wire feed speed of the electrode 105 in response to command signals from the power supply 101.

During welding, the exemplary system shown in FIG. 1 is capable of changing, during a welding process, between two different welding waveform types based on a desired welding parameter. For example, in many welding applications it is desirable to be able to change from a high heat input welding operation (such as pulse or spray pulse welding or spray transfer, positive polarity, high wire feed speed procedures) to a low heat welding operation (such as short arc, surface tension transfer, cold metal transfer, negative polarity, low wire feed speed, procedures. This may desirable because of changing workpiece or weld gap geometries or to provide a stitched type weld joint. Embodiments of the present invention are capable of providing this flexibility during a welding process.

In exemplary embodiments of the present invention, the system 100 provides a first welding waveform to the electrode 105 for welding. This first welding waveform is a high heat input welding waveform, such as a pulse waveform, which utilizes current pulses to transfer droplets from the electrode 105 to the workpiece W during welding. During this welding process the electrode 105 is fed by the wire feeder 103 at a first wire feed speed which is appropriate for the welding operation ongoing. Additionally, this first welding waveform has a first polarity, and since it is a high heat input waveform, this polarity is usually positive. During welding, it may be desirable to switch—on-the-fly—to a low heat input welding process, for various reasons. Embodiments of the present invention allow this to occur.

During welding, the power supply 101 (or any other type of system controller) determines that it is needed to switch from a high heat input welding process to a low heat input welding process. Thus, during welding the power supply switches from the first welding waveform to a second welding waveform, which is a low heat welding waveform. Examples of such low heat welding waveforms include cold metal transfer, short arc, short circuit, and surface tension transfer welding. At the appropriate time the power supply 101 switches from the first welding waveform to a second welding waveform, which has a different current profile, and which will be described further below. Furthermore, the power supply 101 causes the wire feeder 103 to change the wire feed speed to a different wire feed speed during the second welding process. Because it is a lower heat input process the wire feed speed is slower in the second weld process. Furthermore, in an exemplary embodiment of the present invention, the second welding waveform (for the low heat process) has an opposite polarity than the first welding waveform. For example, if the first welding waveform has a positive polarity, the second welding waveform can have a negative polarity. It should be noted that in other exemplary embodiments, the welding waveforms can have the same polarity, even though their relative heat input into the weld is different. Furthermore, in further exemplary embodiments, either one or both of the welding waveforms can be an AC waveform, having varying polarity. For example, it may be desirable that during welding the second welding waveform (low heat input) be an AC waveform. Alternatively, it may be desirable that the high heat input welding waveform be an AC waveform having a portion which is opposite polarity. Various combinations can be utilized without departing from the spirit or scope of the present invention.

In exemplary embodiments of the present invention, the heat input can be determined as Kj/in which is (Amps×Volts×1,000)/(Travel Speed×60). In exemplary embodiments of the present invention a high heat input portion of the welding process will have a higher value for Kj/in than the low heat input portion of the welding process. Thus, a high heat input portion has a higher heat input relatively to the low heat input portion of the process, and the low heat input portion will have a lower heat input than the higher heat input portion. As is generally described herein, lower heat input portions of a welding waveform tend to reduce penetration, bridge gaps and puddle up on top of the workpiece, whereas higher heat input tends to increase penetration, increase burn through and spread out or flatten the weld puddle.

Figure 2:
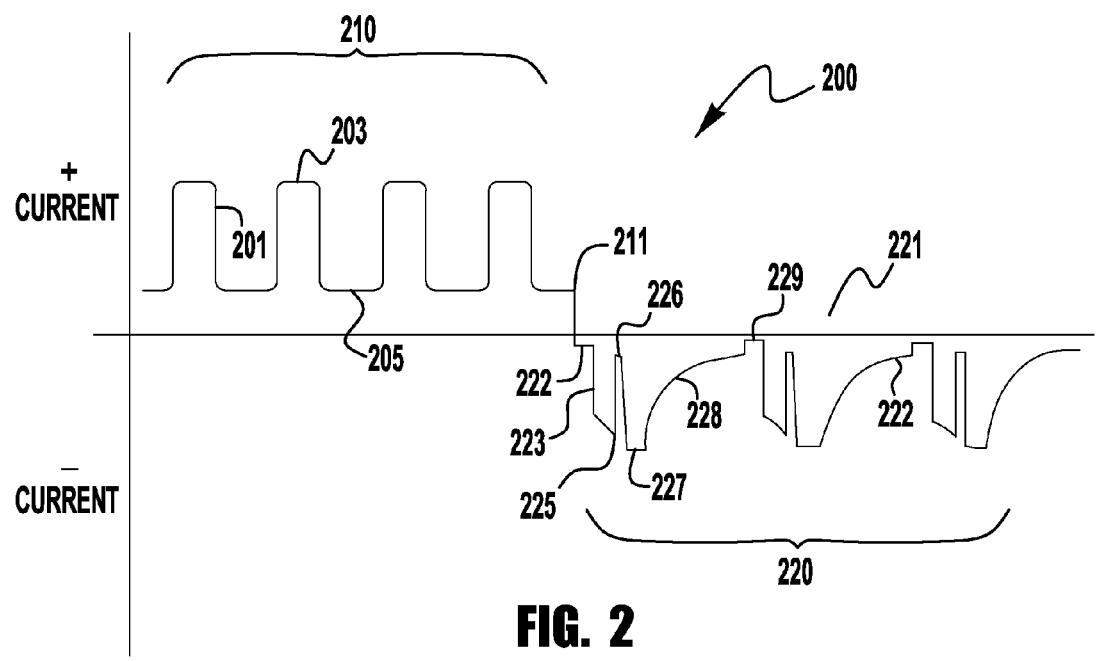
FIG. 2 illustrates a diagrammatical representation of a welding waveform in accordance with an exemplary embodiment of the present invention.

FIG. 2 depicts an exemplary welding waveform 200 which can be used with various embodiments of the present invention. In this embodiment, the waveform 200 has at least two waveform portions 210 and 220. The portion 210 is a high heat input welding portion which is using a pulse-type waveform profile. This portion 201 contains a plurality of current pulses 201 having a peak current level 203, separated by a background current 205. Further, the high heat portion 210 has a positive polarity. It is generally known that pulse welding waveforms of the type shown in FIG. 2 (210) provide good workpiece penetration and are often used for welding thicker workpieces. It is also generally known that high heat input waveforms can be difficult to utilize when trying to bridge large gaps in a weld joint. Furthermore, because of the high heat levels of these types of welding processes the electrode is 105 can be fed at a relatively high wire feed speed, for example 500 ipm.

During welding, it is determined that the welding waveform 200 should change from a high heat input waveform to a low heat input waveform. Thus, during the background current 205, at point 211, the power supply 101 changes the waveform from the first portion 210 to a low heat waveform portion 220. In the embodiment shown the low heat portion 210 is a DC− STT (surface tension transfer) type waveform. A detailed discussion of these types of welding waveforms can be found in U.S. Pat. Nos. 4,972,064 and 6,215,100, the entire disclosures of which are incorporated herein by reference in their entirety, and need not be repeated herein. Of course, as stated above, a STT type waveform is only one example of a low heat input welding waveform that can be utilized in embodiments of the present invention.

As shown in FIG. 2, in this embodiment the power supply 101 not only changes to a new type of welding waveform, but also changes polarity to DC− for the waveform portion 220. After the change of polarity, the current reaches can either reach a background level 222 for the portion 220 or may go directly to a shorting event 229, when the electrode 105 makes contact with the weld puddle. After the shorting event is detected an STT pulse event 221 is triggered. The pulse event includes a pinch current 223 that is provided and causes the electrode 105 to neck down above a molten ball, which occurs at 225. Then the current drops to prevent spatter to a low level 226 before increasing again in a plasma boost pulse 227. After the boost pulse 227 the current tails out 228 to the background current 222 until the next shorting event occurs, and this is repeated, until the waveform 200 is changed back to a high heat portion 210. The low heat waveform portion 220 is generally used for more shallow welds, where too much penetration may be an issue, and/or to fill a wider gap. Because the process is colder the weld puddle can cold lap over the weld joint, which does not provide significant penetration but can cover a wider gap.

At the same time the power supply 101 changes between the waveform portions 210/220, the power supply 101 causes the wire feeder 103 to change the wire feed speed from the first speed to a second wire feed speed. Because the waveform portion 220 is a low heat input portion, the low heat wire feed speed will be slower than the high heat waveform portion 210. For example, the wire feed speed can be approximately 100 ipm.

Of course, it should be noted that although FIG. 2 depicts the high heat input portion 210 prior to the low heat input portion 220, embodiments of the present invention are not limited to this order and, in fact, in embodiments of the invention, the waveform 200 will vary back-and-forth between high (210) and low (220) waveform portions.

When welding certain types of weld joints it may be beneficial to create a stitch-type weld joint having penetration into the weld joint as well as filling an appreciably sized gap. Rather than doing this with multiple passes over the weld joint it is beneficial to complete the weld with as few passes as possible. Embodiments of the present invention allow this to occur by combining two different welding processes into a single welding operation, where both high heat and low heat input welding processes can be used to create a hybrid weld joint having the benefits of both high heat and low heat input welding processes.

Thus, in exemplary embodiments of the present invention, the power supply 101 can frequently change back and forth between high and low heat welding waveforms intermittently to achieve a desired weld bead profile. This can be achieved in a number of different ways. In some exemplary embodiments, the power supply 101 (via its CPU controller, or the like) monitors the time duration of each of the low and high heat portions of the welding operation and switches back and forth between them based on determined time durations. For example, the power supply 101 will weld with the high heat portion of the waveform for a first duration of time and then switch to the low heat portion of the waveform for second duration. The second duration can be the same as, or different, than the first duration. Further, depending on the desired weld bead profile the second duration can either longer or shorter than the first, as needed. For example, in embodiments of the invention the power supply can weld with the high heat portion of the waveform for a duration in the range of 50 to 2,000 ms, and then change to the low heat portion for a duration of 50 to 2,000 ms. These ranges are intended to be exemplary and can often be a function of the wire feed speed changing capabilities of the wire feeder, which can tend to be not as reactive as a welding power supply.

In a further exemplary embodiment, the power supply 101 can change back and forth between the high and low heat welding operations based on a detected number of events. For example, the power supply 101 can change from the high heat portion to the low heat portion after a determined number of pulses 201. That is, during welding the power supply 101 counts the number of pulses and after a certain number N of pulses the power supply switches to the low heat portion of the waveform 200, and then after a certain number X of shorting events 229 have been detected the power supply 101 will switch back to the high heat portion 210 of the waveform 200. The duration and/or number of detected events used to determine the switch point 211 between waveform portions 210/220 can be determined a number of different ways by the power supply 101. For example, based on user input into the power the supply 101, it can use state tables, look-up tables, algorithms, or the like, to determine the durations/number of events for each of the waveform portions. In exemplary embodiments, user input data related to desired heat input, joint geometry or details, wire feed speed, and the like, can be used by the power supply to determine the appropriate ratio of high heat and low heat input welding for a given weld.

The ratios of high to low heat input utilized by exemplary embodiments of the present invention can vary based on the various weld profiles and parameters. The ratios are to be generally optimized for the welding being performed.

Thus, embodiments of the present invention can provide significant versatility in the types of welding that can be performed in a single welding pass. For example, during such welding the low heat welding bridges the weld joint gap and creates a relatively cold weld puddle, but does not appreciably penetrate into the base metal. However, the pulses of the high heat input portion of welding process can arc off the cold puddle (created by the low heat input portion), which may limit some of the penetration depth of these pulses, but this will cause the arc to be wider than the low heat welding arc, and can provide good penetration into the side walls of the joint. That is, some of the penetration power of the high heat pulses can be directed to the sidewalls of the joint to provide a weld bead that has good gap filling characteristics and improved penetration.

Figure 3:
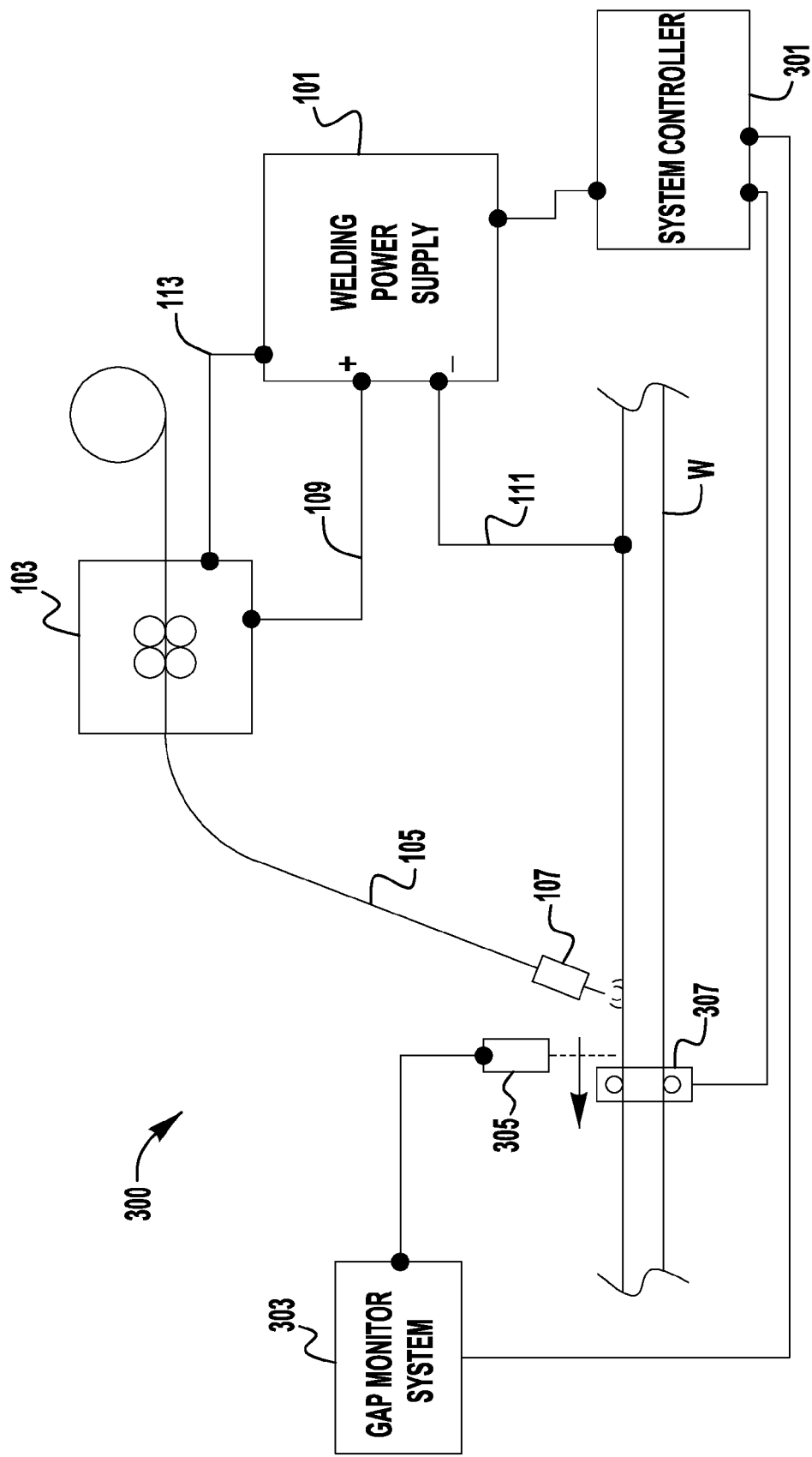
FIG. 3 illustrates a diagrammatical representation of an another exemplary welding system of the present invention.

FIG. 3 depicts another exemplary embodiment of a welding system 300 of the present invention. This system 300 is similar to the system 100 shown in FIG. 1 and generally operates in the same way. However, this embodiment also utilizes at least one of a gap monitoring system 303 and a workpiece thickness detector 307, which provide feedback to a system controller 301 coupled to the power supply 101. The system controller 301 can be any type of computer-like device capable of receiving feedback signals, processing them and communicating the information, with or without control commands, to the power supply 101, which in turn modifies the welding waveform 200 accordingly. It is noted that although the system controller 301 is shown distinct from the power supply 101, in other exemplary embodiments the controller 301 can be integral to the power supply 301 and it need not be a separate structure of device.

The gap monitoring system 303 employs a gap geometry or width detector 305 which can detect variations in a gap width, or geometry, of the weld joint during welding and communicate those detections to the system controller 301. The sensor 305 and system 303 can be any type of system capable of tracking physical properties of the weld joint upstream of the welding operation to determine geometry of the weld joint gap prior to welding. Examples of such systems include camera based systems which visually monitor the gap and/or laser based joint tracking systems which utilize a laser beam to monitor changes in gap shape or geometry. Such systems are generally known and need not be discussed in detail herein.

During welding, the system 303 monitors the gap width, or any other desired geometric feature of the weld joint, and communicates the detected information to the controller 301. When a change in the geometry of the joint is detected (for example a change in the gap width) the controller 301 provides this information to the power supply 101, which then modifies the waveform 200 as needed. Using this information, the power supply can change from the high heat input portion 210 to the low heat input portion 220 of the waveform 200 based on the detected geometry change, or vice versa. For example, if it is detected that the joint gap has increased, the power supply 101 can change the waveform from the high heat portion 210 to the low heat input portion 220 of the waveform to ensure proper welding of the increased gap. In other exemplary embodiments, the power supply 101 can adjust the ratio of high heat input portion 210 to low heat input portion 220 of the waveform 200 to achieve the desired weld bead profile. As an example, during welding the waveform 200 may have a ratio such that the respective durations of each of the high and low heat input portions are the same, i.e., a 50/50 ratio. Then, when a gap width increase is detected the ratio of durations is adjusted to properly address the change in gap width. Again, the waveform 200 can be changed such that the duration of the low heat portion 220 is higher than the duration of the high heat portion. Similar, if the detected gap width decreases the power supply 101 can adjust the waveform 200 so that the bead becomes narrower, by decreasing the duration of the low heat portions 220 of the waveform 200. With such versatility, embodiments of the present invention can adjust on-the-fly, during welding to variances and changes in the weld joint geometry. This versatility can greatly increase workpiece throughput.

Similarly, in exemplary embodiments of the present invention, the detected thickness of the workpiece(s) at the weld joint can be utilized by the system 300 to modify the waveform 200 as desired. During welding a thickness sensor 307 detects the thickness at the weld joint and provides this information to the controller 301, and the thickness information is used by the power supply 101 to change the waveform 200 appropriately. For example, during welding if a thickness increase is detected the power supply 101 can adjust the waveform 200 such that the duration of the high heat portions 210 is increased. By increasing the high heat portions 210 an increased weld penetration can be achieved. Similarly, if a thickness decreases during welding the duration of the high heat portions can be decreased to reduce penetration.

The thickness sensor 307 can be any type of sensor that is capable of detected the thickness of the workpiece(s) W during welding and provide that data to the controller 301 to be used by the power supply 101. It can be a contact or non-contact type sensor. For example, the sensor 307 can be of a type that makes physical contact on both sides of the workpiece and is able to determine of there is a change in thickness during the welding process. Again, such types of sensors are generally known and need not be discussed in detail herein.

Thus, embodiments of the present invention are capable of adjusting the provided welding waveform, during welding, based on detected weld joint geometry and change between two different welding waveform types to achieve a desired weld bead profile.

In further exemplary embodiments of the present invention, in addition to changing the respective durations of the high and low heat input portions of the waveform, the power supply 101 and/or controller 301 can change the peak currents, frequency, current peak durations, or any other aspects of the waveform portions 210/220 as needed to achieve the desired weld joint profile. For example, if, based on the detected geometry/thickness of the joint, it is determined that additional penetration is needed the power supply 101 can increase the peak current for the pulses 201 of the high heat portion 210 to provide deeper penetration, or if the joint volume increases (and is detected by any sensor mechanism—or is preprogrammed), the detector can instruct the controller to further increase the wire feed speed to fill the joint. Alternatively, the ratio of high heat to low heat can be increased where the high heat portion has a higher wire feed speed than the low heat portion to add more filler to the weld joint.

In the embodiment shown in FIG. 3 the system controller 301/power supply 101 is using real time feedback information regarding the geometry/thickness of the weld joint during welding. That is, as the weld progresses the detected parameters are provided to the controller 310 to adjust the waveform 200 accordingly. However, in other exemplary embodiments it is not necessary for the real time feedback. Rather, the weld joint geometry can be mapped prior to welding. That is, prior to the welding operation beginning the geometry of the weld joint can be mapped (using similar geometry and thickness detection devices) and the mapped parameters can be stored and processed in the system controller 301 prior to the welding operation beginning. Then, the system controller 301 can use the mapped data to create the desired welding waveform 200 taking into account any geometry/thickness/joint volume changes and ensuring that the appropriate waveform portions 210/220 are utilized at the appropriate points on the weld joint. Further, the system controller 301 can evaluate the mapped information regarding the weld joint and determine if there are any issues or anomalies with the weld joint that would prevent a proper weld from being performed. For example, if a detected gap is too large to weld, the system controller 301 can signal a user regarding the anomaly.

In yet a further embodiment, the weld joint geometry (e.g., gap width) and/or thickness can be preprogrammed by a user such that the controller 301 and power supply 101 can use the information to create the appropriate weld waveform 200 for the welding operation.

Therefore, with embodiments of the present invention, weld joints with varying geometries and varying thickness can be welded relatively easily with a single welding operation.

Various control methodologies can be utilized by the power supply 101 to control the creation of the waveform 200 during welding. For example, the power supply 101 can use state tables, algorithms, look-up tables, or other appropriate control methodologies to determine and implement the appropriate waveform 200 needed for the welding operation. Such control/programming methodologies are generally known and need not be described in detail herein.

Figure 5:
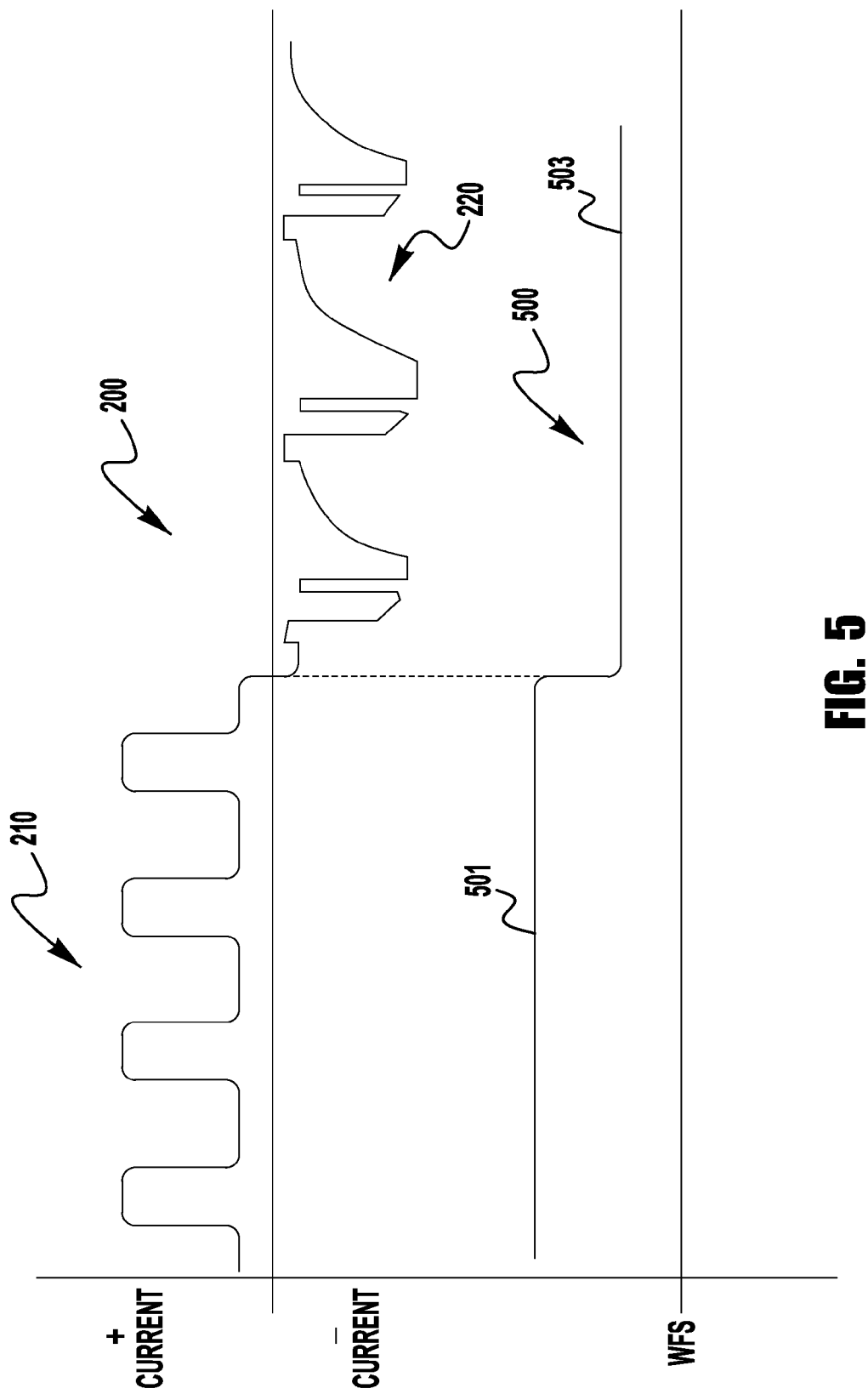
FIG. 5 illustrates a diagrammatical representation of a further welding waveform generated in accordance with exemplary embodiments of the present invention coupled with a wire feed speed graph.

In the above embodiments, it is noted that the controller 301 and/or the power supply 101 appropriately controls the wire feeder 103 so that the appropriate wire feed speed is provided during each of the respective high and low heat inputs portions 220/210 of the waveform 200. An example of this is shown in FIG. 5. As shown, as the waveform 200 transitions from the high heat portion 210 to the low heat portion 220 the wire feed speed drops from a higher speed to a lower speed. Similarly, when changing from a low heat portion 220 to a high heat portion 210 the wire feed speed is increased as needed.

As described herein, embodiments of the present invention involve changing various waveform attributes, including polarity and current profiles, along with the wire feed speed to achieve a desired or optimized heat input ratio (of high to low heat input). In some exemplary embodiments, the changes to the welding waveform (for example, polarity) are changed at the same time the change in wire feed speed is triggered or initiated. However, it is recognized that in some applications the change in wire feed speed does not occur as rapidly as changes in the welding waveform. For example, it is generally recognized that there is some latency in between the triggering of a change in wire feed speed and the changing of the actual speed of the wire at the workpiece. Therefore, in some exemplary embodiments of the present invention the actual wire feed speed at (or near) the workpiece is monitored and change in the welding waveform is triggered only after the actual detected wire feed speed reaches a threshold value. Thus, in some exemplary embodiments the power supply will not switch polarities of the welding waveform until the detected wire feed speed is within a predetermined percentage of the commanded or targeted wire feed speed. For example, if a low heat input welding operation is ongoing and it is desired to switch to a high heat input portion (with a change in polarity), the change will be initiated in the system but the power supply will not switch polarities until the detected wire feed speed is within 70% of the desired increased wire feed speed—utilized with the high heat input portion of the weld. In other embodiments, the change can be initiated when the speed is within 80% of the targeted wire feed speed. Of course, the same can be implemented when transferring from high heat (and high speed) down to a low heat (low speed) portion of the waveform. Such embodiments ensure that the welding waveform is changed between the high and low heat portions of the welding waveform when the detected wire feed speed is at our near its desired speed for the next portion of the welding waveform. Wire feed speed detection mechanisms are generally known and need not be discussed in detail herein.

In other exemplary embodiments, in addition to changing the waveform 200 and wire feed speed, the travel speed of the welding operation can be increased/decreased as needed to attain the desired weld bead profile. For example, as indicated previously, the travel speed and heat input can be changed based on changes in the joint volume.

Figure 4:
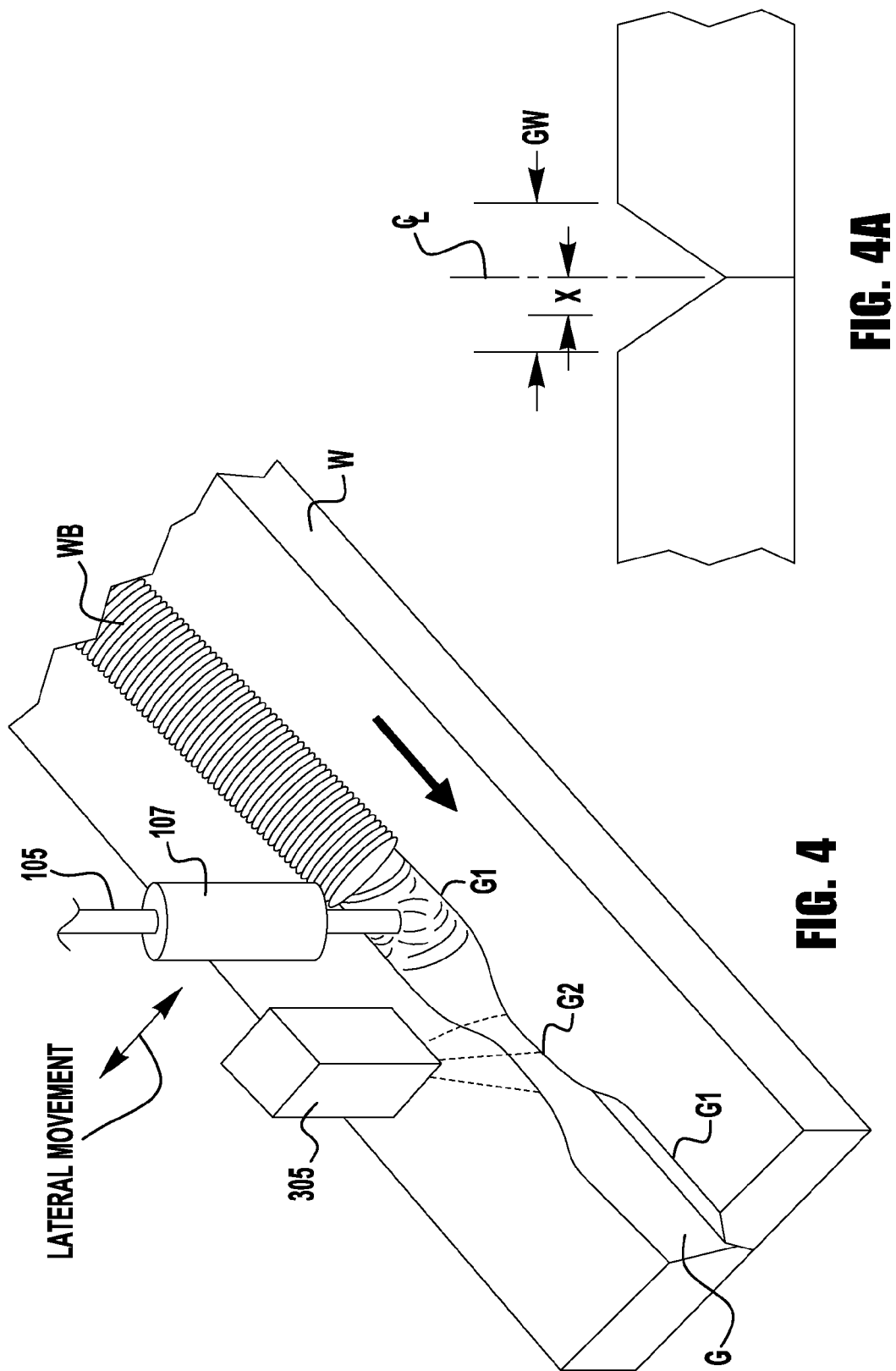
FIG. 4 illustrates a diagrammatical representation of an exemplary weld being performed with an embodiment of the present invention.

FIG. 4 depicts an exemplary welding operation, where the weld joint gap G has varying thickness. As shown, the weld joint has a first gap thickness G1 which is wider than a second gap thickness G2. During welding the sensor 305 detects the change in gap width and communicates this change to the controller 301 and/or power supply 101 so that the power supply 101 adjust the waveform 200 appropriately for the detected gap change. Thus, the power supply 101 will change the waveform 200 to deal with the detected gap width change. For example, the power supply can initiate a change between the ratio of high heat and low heat welding to compensate for the change in the joint, or can change the relative durations of each of the high and low heat portions of the waveform to achieve the desired weld bead profile. It is known that, often a joint will close up as the joint is being welded. This can be due to the solidification of weld metal pulling the joint closed. The exemplary embodiment shown in FIG. 4 can be utilized to detect that closing of the joint and thus cause a change in the high heat/low heat input ratio to compensate for the closing of the gap. Such compensation may or may not include a change in the metal transfer function or polarity of the waveform, but may only cause a change in high heat input—via high wire feed speed—to low heat input—via low wire feed speed, and any appropriate changes in the welding waveform parameters, such as current, voltage, etc.

Also shown in FIG. 4 is the ability for the welding operation to move laterally across the welding gap G. Such movement can be used to create a "weave" weld pattern. Welding operations utilizing lateral movement are known and will not be discussed in detail herein. Exemplary embodiments of the present invention can utilize the lateral positioning of the contact tip 107 and/or wire 105—relative to the centerline of the gap G—to control the heat input into the weld. For example, some exemplary embodiments can use the sensor 305 to determine the lateral positioning of the contact tip 107 (or electrode 105) with respect to the gap and change between high heat input and low heat input welding operations based on that lateral positioning. Furthermore, in those welding operations which are fully or semi-automated, the lateral positioning can be known via the programming of the movement mechanisms and/or carriage device and therefore this positional information can be utilized by the system to determine the lateral location of the tip 107/wire 105 during welding. Based on the lateral positioning the system can change the welding operation back and forth between high and low heat input operations to achieve the desired weld bead profile. For example, it may be desirable to utilize the high heat input welding operations when the wire 105 is at or near the center of the gap G—which can be the deepest part of the weld joint and require the most fill, and then as the wire 105 approaches the edges of the gap the welding operation can change from the high heat input operation to the low heat input operation. For example, as shown in FIG. 4A, when the electrode 105 is positioned at or within a distance X of the centerline of the gap G the welding operation uses a high heat input operation, and when the electrode 105 is outside of the distance X the welding operation uses a low heat input profile. In some exemplary embodiments, the distance X from the centerline is 25% of the overall gap width GW. In other exemplary embodiments, the distance X is 40% of the overall gap width GW.

Alternatively, an opposite welding methodology can be used to obtain increased penetration in the side walls of a joint. Specifically, again looking at FIG. 4A, within the distance X of the centerline a low heat input profile can be used to aid in bridging any existing gap between the workpieces. However, as the electrode 105 translates outside of the distance X a high heat profile is utilized to increase penetration into the sidewalls of the joint. Therefore, embodiments of the present invention allow for increased flexibility in control penetration and heat input into a weld joint.

Similarly, methods of control can be used based on the depth of the weld joint below the electrode 105 during welding. For example, when the system is welding at the deepest point of the weld joint the welding operation will have a high heat input weld profile. As the lateral movement progresses and the depth of the weld joint gets shallow the depth of the joint can be detected during welding such that as the weld joint gets shallower and reaches a depth threshold the system switches to the low heat input portion of the welding operation. This depth threshold can be preprogrammed or can be input by a user. Of course, in other embodiments the low heat input welding can be used at the deepest portion of the weld joint and the high heat input welding can be initiated as the depth of the weld joint passes the designated depth threshold.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A welding system, comprising:
a welding power supply which provides a current welding waveform to a welding electrode; and
a wire feeder which provides said welding electrode to at least one workpiece to be welded by said power supply;
wherein said current welding waveform has a first waveform portion with a first current profile and a second waveform portion with a second current profile, where said first current profile is different from said second current profile and said current welding waveform periodically switches from said first current profile to said second current profile,
wherein said first waveform portion provides a higher heat input during welding than said second waveform portion,
wherein said wire feeder provides said welding electrode at a first wire feed speed during said first waveform portion and at a second wire feed speed during said second waveform portion, where said first wire feed speed is different than said second wire feed speed, and
wherein at least one of said first and second current profiles is an AC current profile.

2. The welding system of claim 1, wherein said first wire feed speed is faster than said second wire feed speed.

3. The welding system of claim 1, wherein said first current profile is a pulse current profile.

4. The welding system of claim 1, wherein said second current profile is a surface tension transfer current profile.

5. The welding system of claim 3, wherein said power supply changes from said first current profile to said second current profile only during a background current level of said first current profile.

6. The welding system of claim 1, wherein said power supply maintains at least one of said first and second current profiles for a duration of 50 to 2,000 ms before switching to the other of said first and second current profiles.

7. The welding system of claim 1, wherein said power supply switches between said first and second current profiles based on a lateral position of said welding electrode relative to a centerline of a weld joint.

8. The welding system of claim 7, wherein said power supply switches between said first and second current profiles when said lateral position is determined to be at least 25% of a weld joint gap width from said centerline.

9. The welding system of claim 1, wherein said power supply switches between said first and second current profiles only when it is detected that said wire feeder is providing said welding electrode within 70% of a desired wire feed speed.

10. The welding system of claim 1, wherein said power supply regulates a heat input into said at least one workpiece by controlling a ratio between said first and second waveform portions.

11. The welding system of claim 10, wherein said power supply regulates said heat input based on at least a weld joint geometry.

12. The welding system of claim 1, wherein said first current profile is the AC current profile.

13. The welding system of claim 1, wherein said second current profile is the AC current profile.

14. The welding system of claim 1, said current welding waveform periodically switches from said first current profile to said second current profile based on a detected number of events.

15. The welding system of claim 14, wherein said detected number of events is a number of pulses of at least one of said first current profile and said second current profile.

16. The welding system of claim 14, wherein said detected number of events is a number of shorting events.

17. The welding system of claim 1, said current welding waveform periodically switches from said first current profile to said second current profile based on a time duration of at least one of said first current profile and said second current profile.

* * * * *